United States Patent
Surendranath et al.

(10) Patent No.: US 11,767,597 B2
(45) Date of Patent: Sep. 26, 2023

(54) MOLTEN METAPHOSPHATE ELECTROLYSIS FOR PRODUCTION OF WHITE PHOSPHORUS

(71) Applicant: MASSACHUSETTS INSTITUTE OF TECHNOLOGY, Cambridge, MA (US)

(72) Inventors: Yogesh Surendranath, Cambridge, MA (US); Andrew Licini, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/275,331

(22) PCT Filed: Sep. 22, 2019

(86) PCT No.: PCT/US2019/052319
§ 371 (c)(1),
(2) Date: Mar. 11, 2021

(87) PCT Pub. No.: WO2020/061551
PCT Pub. Date: Mar. 26, 2020

(65) Prior Publication Data
US 2022/0049364 A1     Feb. 17, 2022

Related U.S. Application Data

(60) Provisional application No. 62/735,168, filed on Sep. 23, 2018.

(51) Int. Cl.
*C25B 1/01*     (2021.01)
*C25B 1/50*     (2021.01)
*C25B 15/08*     (2006.01)
*C25B 15/021*     (2021.01)
*C01B 25/02*     (2006.01)
(Continued)

(52) U.S. Cl.
CPC .................. *C25B 1/01* (2021.01); *C25B 1/50* (2021.01); *C25B 9/17* (2021.01); *C25B 9/65* (2021.01); *C25B 11/043* (2021.01); *C25B 15/021* (2021.01); *C25B 15/08* (2013.01); *C25B 15/083* (2021.01); *C01B 25/02* (2013.01)

(58) Field of Classification Search
CPC .... C25B 1/00; C25B 1/01; C25B 1/50; C25B 15/083; C25B 15/021; C25B 15/08; C25B 11/02
See application file for complete search history.

(56) References Cited

U.S. PATENT DOCUMENTS 2,965,552 A     12/1960    Gruber
3,927,192 A     12/1975    Bamberger et al.
(Continued)

FOREIGN PATENT DOCUMENTS

KR     10-2016-01199457 A     10/2016

OTHER PUBLICATIONS

Caton et al; "Polarography in Fused Alkali Metaphosphates" Analytical Chemistry, vol. 35, No. 13, 1963, p. 2103-2108. (Year: 1963).*

(Continued)

*Primary Examiner* — Brian W Cohen
(74) *Attorney, Agent, or Firm* — Honigman LLP (57) ABSTRACT

An electrolytic system and method of manufacturing white phosphorus.

18 Claims, 9 Drawing Sheets

(51) Int. Cl.
*C25B 9/17* (2021.01)
*C25B 11/043* (2021.01)
*C25B 9/65* (2021.01)

(56) References Cited

U.S. PATENT DOCUMENTS

| | | | |
|---|---|---|---|
| 6,198,037 B1 | 3/2001 | Nakata | |
| 2009/0032405 A1* | 2/2009 | Ono | C25C 7/005 |
| | | | 204/243.1 |
| 2010/0006448 A1 | 1/2010 | Dring et al. | |
| 2013/0171538 A1 | 7/2013 | Jensen et al. | |

OTHER PUBLICATIONS

International Search Report dated Nov. 25, 2019 in corresponding International Patent Application No. PCT/US2019/052319.
Written Opinion of the International Searching Authority dated Nov. 25, 2019 in corresponding International Patent Application No. PCT/US2019/052319.

* cited by examiner

MOLTEN METAPHOSPHATE ELECTROLYSIS FOR PRODUCTION OF WHITE PHOSPHORUS

PRIORITY CLAIM

This application is a National Phase application filed under 35 USC § 371 of International Application No. PCT/US2019/052319, filed on Sep. 22, 2019, which claims the benefit of prior filed U.S. Provisional Patent Application No. 62/735,168, filed Sep. 23, 2018, each of which is incorporated by reference in its entirety.

FIELD OF THE INVENTION

The invention relates to systems and methods for the manufacture of white phosphorus.

BACKGROUND

The production of white phosphorus in industry is currently carried out by the thermochemical reduction of phosphate minerals with a global output rate of 915,000 tons per year. See, for example, Deloitte Sustainability; British Geological Survey; Bureau de Recherches Géologiques et Minières; Netherlands Organisation for Applied Scientific Research. *Study on the review of the list of Critical Raw Materials: Critical Raw Materials Factsheets*; Brussels, 2017, which is incorporated by reference in its entirety. This process consumes an excess of coke as a terminal reductant and generates a number of unwanted byproducts, notably including carbon monoxide. See, Hurst, T. L. In *Phosphorus and its Compounds, Vol. II*; van Wazer, J. R., Ed.; Interscience: New York, 1961; pp 1149-1219, which is incorporated by reference in its entirety. Because carbon dioxide reacts with white phosphorus to generate phosphorus pentoxide and carbon monoxide, the maximum electron efficiency of this process is limited to 50%, with the remaining 50% being consumed by the combustion of waste CO to generate 3,250,000 tons of $CO_2$ global emissions per year.

SUMMARY

In general, a method of generating elemental phosphorus can include providing a melt of a metaphosphate salt, applying an electrolysis voltage across a cathode and an anode in the melt, and collecting an elemental phosphorus separate from an oxidized product.

In another aspect, an elemental phosphorus manufacturing system can include a housing, a cathode within the housing, an anode within the housing, a voltage supply configured to apply an electrolysis voltage to the anode and the cathode, a gas inlet to the housing, a first outlet of the housing to release an oxidized product, and a second outlet of the housing to release an elemental phosphorus product.

In certain circumstances, the elemental phosphorus can include $P_4$.

In certain circumstances, the oxidized product can include oxygen gas.

In certain circumstances, the oxidized product can include carbon monoxide or carbon dioxide.

In certain circumstances, the method can include carrying the elemental phosphorus away from the melt using a gas.

In certain circumstances, the metaphosphate salt can include sodium metaphosphate, lithium metaphosphate, potassium metaphosphate, or a mixture thereof.

In certain circumstances, the method can include maintaining the melt at a temperature less than 1500° C., less than 1300° C., less than 1100° C., less than 1000° C., less than 900° C., between 500° C. and 900° C., between 600° C. and 875° C., between 650° C. and 850° C., or between 750° C. and 850° C.

In certain circumstances, the electrolysis voltage can be between 0.1 and 5.0 V, between about 0.4V and 2.0V, between about 0.5V and 1.8V, or between about 0.6V and 1.7V.

In certain circumstances, the electrolysis voltage can be 0.1, 0.2, 0.3, 0.4, 0.5 V, 0.6V, 0.7V, 0.8V, 0.9V, 1.0V, 1.1V, 1.2V, 1.3V, 1.4V, 1.6V, 1.7V, 1.8V or 1.9V, 2.0 V, 2.1 V, 2.2 V, 2.3 V, 2.4 V, 2.5 V, 2.6 V, 2.7 V, 2.8 V, 2.9 V, 3.0 V, 3.1 V, 3.2 V, 3.3 V, 3.4 V, 3.5 V, 3.6 V, 3.7 V, 3.8 V, 3.9 V, 4.0 V, 4.1 V, 4.2 V, 4.3 V, 4.4 V, 4.5 V, 4.6 V, 4.7 V, 4.8 V, 4.9 V, or 5.0 V.

In certain circumstances, a current density during electrolysis can be greater than 20 mA cm$^{-2}$, greater than 40 mA cm$^{-2}$, greater than 60 mA cm$^{-2}$, greater than 80 mA cm$^{-2}$, or greater than 100 mA cm$^{-2}$.

In certain circumstances, the melt can be substantially free of transition metals.

In certain circumstances, the melt can be substantially free of halides.

In certain circumstances, the melt can be contained in a crucible.

In certain circumstances, the anode can be an electrode material that facilitates oxygen production.

In certain circumstances, the anode can include platinum or carbon.

In certain circumstances, the cathode can include carbon.

In certain circumstances, the cathode can be carbon having a sharp end.

In certain circumstances, the method can include adding phosphoric acid to the melt to replenish phosphorus.

In certain circumstances, the cathode can include a tip that facilitates release of gaseous products produced at the cathode.

In certain circumstances, the system can include a casing surrounding the anode.

In certain circumstances, the housing can include a crucible.

In certain circumstances, the method can include adding an additive to the melt. For example, the additive can be a metal salt, a phosphate minerals (other than metaphosphate), a promoter or other compounds.

Other aspects, embodiments, and features will be apparent from the following description, the drawings, and the claims.

DETAILED DESCRIPTION

Figure 1:
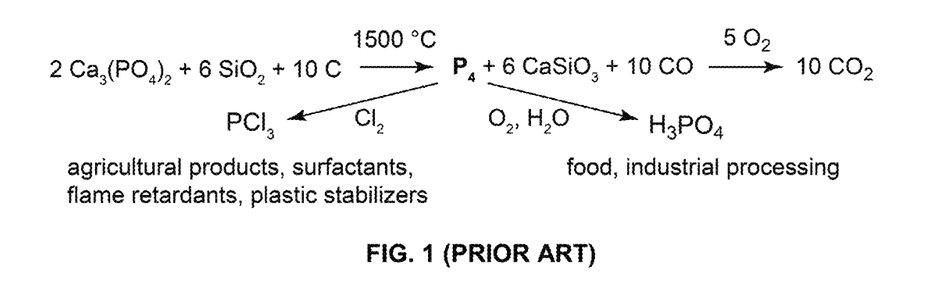
FIG. 1 depicts a traditional method of manufacturing phosphorus.

In general, a molten metaphosphate electrolysis system for production of white phosphorus is described. Current methods for the production of white phosphorus rely on the oxidation of carbon to produce 10 units of carbon monoxide per unit of product, which must be burned off to carbon dioxide in a separate step. See FIG. 1. Additionally, calcium silicate slag, a secondary byproduct, must constantly be removed from the bottom of the reactor.

Figure 2:
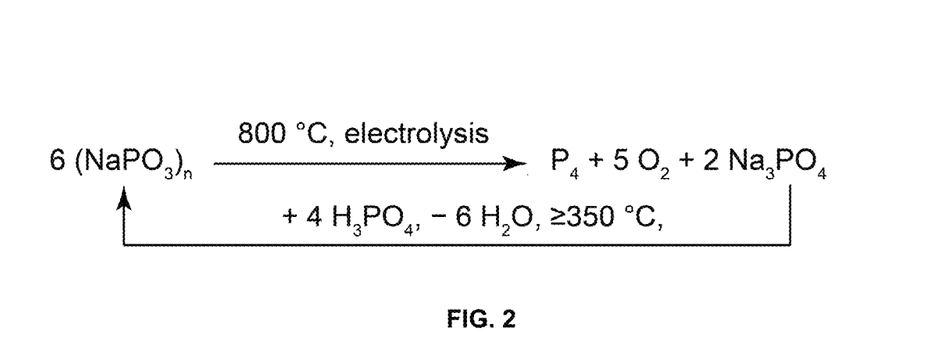
FIG. 2 depicts a method of electrolytic manufacture of phosphorus.

Electrolytic splitting of phosphate ions into elemental phosphorus and oxygen is shown in FIG. 2. Because this reaction is thermodynamically disfavored, it would, by necessity, need to be driven electrochemically. In the case of a molten salt electrolysis, all of these disadvantages are eliminated, since 1) the only gaseous electrochemical products are phosphorus and oxygen and 2) the only other products would be alkali orthophosphates, or, if phosphoric acid is used to restore the melt, water vapor. The electrode can be, for example, carbon or platinum. In one example, the reaction vessel and cathode material can be carbon, a cheap material, and the use of a sacrificial carbon anode can still present benefits over other electrode systems due to the ability to extract electrons more efficiently to evolve carbon dioxide. Alternatively, the cathode material can be platinum, which could be preferred in certain circumstances. In other circumstances, the electrodes can include metals, such as platinum, graphite, tungsten, copper, conducting or semiconducting metal oxides, or combinations thereof.

In addition, because this electrolysis can be performed at much lower temperatures than the industry standard (<800° C. vs. 1500° C.), the process would no longer be restricted to large and expensive arc furnaces, and, thus, could be scaled down and performed on-site in local locations for example, companies that require white phosphorus. White phosphorus has traditionally been shipped over long distances as a hazardous liquid, a transportation method which periodically leads to large-scale industrial catastrophes. An on-site production method could eliminate these hazards entirely, a significant advantage over prior methodologies.

Finding an alternative terminal reductant and lowering the carbon footprint of $P_4$ production is, therefore, key for increasing the sustainability of phosphorus chemistry.

The methodology is depicted in FIG. 2. In general, a method of generating elemental phosphorus can include providing a melt of a metaphosphate salt, applying an electrolysis voltage across a cathode and an anode in the melt, and collecting an elemental phosphorus product separate from an oxidized product. The elemental phosphorus product can include $P_4$. The oxidized product can include oxygen gas. In certain circumstances, the oxidized product can be carbon monoxide or carbon dioxide. In certain circumstances, the ion balance of the melt could be restored by the addition of phosphoric acid and dehydration to eliminate the need to remove residual alkali salts from the reactor.

As described herein, references to a metaphosphate salt include all chain lengths of metaphosphate $((M^+PO_3^-)_n,$ n=3, 4, 5, 6, etc.) (i.e. tri, tetra, hexa, etc.) in the melt.

Figure 10:
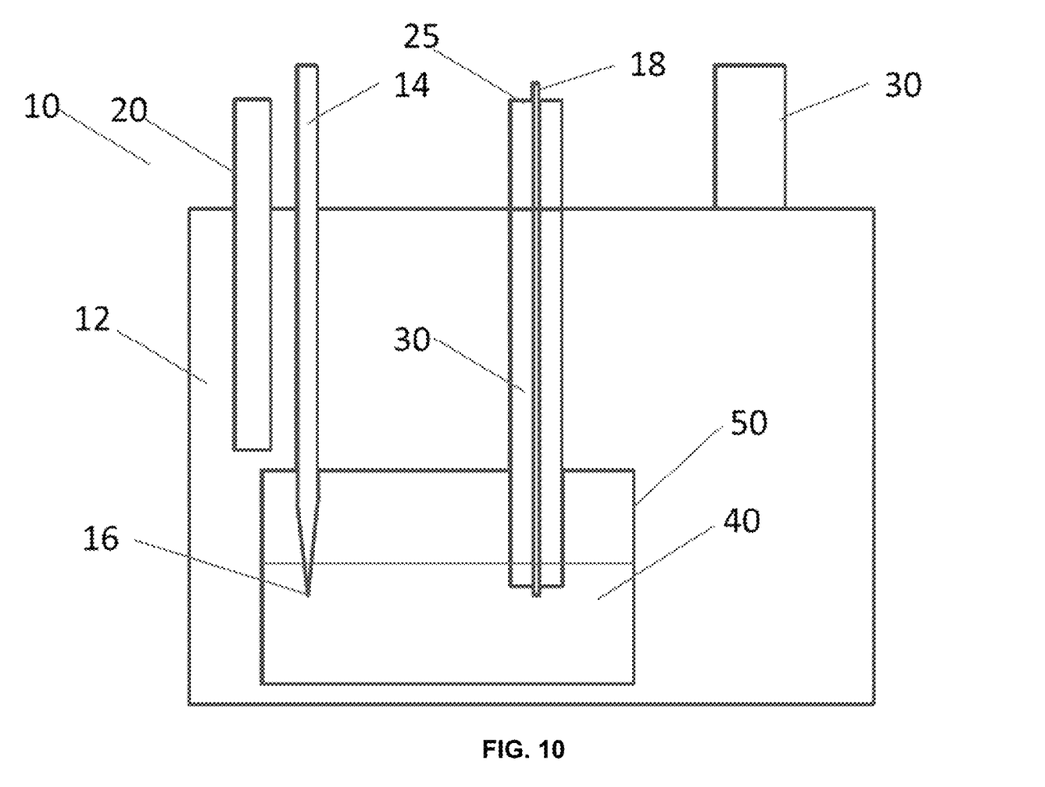
FIG. 10 depicts elemental phosphorus manufacturing system.

Referring to FIG. 10, phosphorus manufacturing system 10 includes a housing 12, cathode 14, and anode 18. An electrolysis voltage is applied to the anode and the cathode. Cathode 14 can have a tip 16 that can have a sharp point that facilitates release of gaseous products produced at the cathode, such as elemental phosphorus product, for example, $P_4$. Gas inlet 20 can be used to introduce a gas, such as nitrogen, into the housing 12. The gas, including the elemental phosphorus product, can be carried out of gas outlet 30, which can be an elemental phosphorus release port. Casing 30 can surround anode 18. Casing 30 creates a space around anode 18 that can allow an oxidized product, such as oxygen gas, carbon monoxide or carbon dioxide, to exit housing 12 through port 25, which can be an oxidized product release port. Cathode 14 and anode 18 can be positioned into melt 40 (when present), which can be contained in crucible 50.

An inert gas, such as nitrogen or argon, can carry the elemental phosphorus away from the melt. The melt, the cathode and the anode can be contained in a housing having an elemental phosphorus release port and an oxidized product release port separate from the elemental phosphorus release port.

In certain circumstances, the metaphosphate salt can be sodium metaphosphate, lithium metaphosphate, potassium metaphosphate, or a mixture thereof. The melt can be held at a temperature less than 1500° C., less than 1300° C., less than 1100° C., less than 1000° C., less than 900° C., between 500° C. and 900° C., between 600° C. and 875° C., between 650° C. and 850° C., or between 750° C. and 850° C. Other metaphosphates including other cations, for example, or including other flux materials, can have lower melting points. For example, an ionic liquid material can be a fluid at room temperature.

The electrolysis voltage can be between about 0.1 and 5.0 V, between about 0.4V and 2.0V, between about 0.5V and 1.8V, or between about 0.6V and 1.7V. In certain circumstances, the electrolysis voltage can be 0.1, 0.2, 0.3, 0.4, 0.5 V, 0.6V, 0.7V, 0.8V, 0.9V, 1.0V, 1.1V, 1.2V, 1.3V, 1.4V, 1.6V, 1.7V, 1.8V or 1.9V, 2.0 V, 2.1 V, 2.2 V, 2.3 V, 2.4 V, 2.5 V, 2.6 V, 2.7 V, 2.8 V, 2.9 V, 3.0 V, 3.1 V, 3.2 V, 3.3 V, 3.4 V, 3.5 V, 3.6 V, 3.7 V, 3.8 V, 3.9 V, 4.0 V, 4.1 V, 4.2 V, 4.3 V, 4.4 V, 4.5 V, 4.6 V, 4.7 V, 4.8 V, 4.9 V, or 5.0 V. The current density during electrolysis can be greater than 20 mA cm$^{-2}$, greater than 40 mA cm$^{-2}$, greater than 60 mA cm$^{-2}$, greater than 80 mA cm$^{-2}$, or greater than 100 mA cm$^{-2}$.

In certain circumstances, the melt can be substantially free of transition metals. In certain circumstances, the melt can be substantially free of halides. The melt can be contained in a crucible, for example, and alumina crucible or carbon crucible.

The anode can be an electrode material that facilitates oxygen production. For example, the anode can be or can include a noble metal, for example, platinum or palladium. The anode can be a ceramic metal composite (cermet). In other circumstances, the anode can be a sacrificial electrode, for example, a carbon-containing electrode that releases carbon monoxide or carbon dioxide.

In certain circumstances, the anode can be surrounded by a casing that channels the oxidized product away from the melt. The casing can channel the metaphosphate cation, for example, sodium ion. The casing can be an aluminum oxide, for example, beta alumina.

The cathode can be an electrode material that facilitates gas production and release. For example, the cathode can have a surface structure that readily releases a gas when formed on the surface, such as a surface region having a high radius of curvature relative to other surfaces. The cathode surface can have a pointed surface. The cathode can be a carbon cathode.

During electrolysis, the method can include adding phosphoric acid to the melt to replenish the source of phosphorus.

Molten salt electrolysis technology, via product collection by condensation, gas separation and the geometric design of the cathode, can produce and collect white phosphorus via rapid evolution from the cathode. Furthermore, by performing the oxidation at the counter electrode inside a tube submerged in the melt, the cathodic and anodic gas streams are separated by the negligible solubility of gas in the high-temperature melt. This allows for theoretically near-perfect product separation as well as the evolution of more reactive gases like oxygen or, on a carbon anode, carbon dioxide, instead of carbon monoxide. The ultimate purpose of this technology is a carbon-free electrolysis process for generating white phosphorus.

Metaphosphates can be used as an electrolyte for phosphate reduction. As shown in FIG. 2, white phosphorus can be produced through electrochemical methods. Although protic electrolytes present fundamental problems due to the competing electrochemical reduction of protons, as shown here:

(see, Vanýsek, P. In *Handbook of Chemistry and Physics: 93rd Edition*; Chemical Rubber Company, 2012; pp 5-80, which is incorporated by reference in its entirety). An aprotic system can avoid this problem.

Inorganic phosphate salts are insoluble in most organic solvents. Neat metaphosphate salts $(MPO_3)_n)$ can be employed as an alternative molten salt electrolyte composed entirely of phosphates. For example, melts of sodium metaphosphate $((NaPO_3)_n)$ presents a number of useful properties for this electrolysis process, including: (1) their relatively low melting point of 625° C.; (2) their ease of synthesis at 350° C. from $NaH_2PO_4$ or at 600° C. from $H_3PO_4$ and NaCl; and (3) their ability to accept or donate oxide ions via the breaking or formation of polyphosphate bonds. See, Greenfield, S.; Clift, M. *Analytical Chemistry of the Condensed Phosphates*; Pergamon: Oxford, 1975 and Minh, D. P.; Ramaroson, J.; Nzihou, A.; Sharrock, P. *Ind. Eng. Chem. Res.* 2012, 51 (10), 3851-3854, each of which is incorporated by reference in its entirety. This third property allows metaphosphate chains to act as metal oxide acceptors analogously to $SiO_2$ in the current thermal process, which is critical for driving the release of reduced phosphorus gas.

The capacity of metaphosphate salts for electrolysis has been confirmed by a number of researchers with a reported solvent window of 0.95 V on Pt electrodes. See, for example, Andreeva, V. N. *Ukr. Khim. Zh.* 1955, 21, 569, Yocom, P. N. The preparation of transition metal phosphides by fused salt electrolysis, University of Illinois, 1958, Laitinen, H. A.; Lucas, K. R. *J. Electroanal. Chem.* 1966, 12, 553-563, Franks, E.; Inman, D. *J. Electroanal. Chem.* 1970, 26, 13-26, Franks, E.; Inman, D. *J. Appl. Electrochem.* 1971, 14, 73-78, and Caton, R. D.; Freund, H. *Anal. Chem.* 1963, 35 (13), 2103-2108, each of which is incorporated by reference in its entirety. The anodic half-reaction is reasonably well-documented for these melts, especially when using anodically-stable Pt. Under these conditions, the gaseous anodic product is $O_2$ and has been shown to strongly depend on the effective oxide concentration in the melt. In contrast, the cathodic half-reaction is comparatively poorly understood—the end product has been presumed to be $P_4$ based on indirect evidence, including the formation of a flammable gas, condensation of red phosphorus on interior surfaces or post-combustion precipitation of the contents of a bubbler. Additionally, little to no kinetic information is available for the cathodic process, owing in part to the corrosion of platinum electrodes under cathodic polarization. Even when employing corrosion-resistant carbon electrodes, irreproducibility and periodic behavior have been observed, obviating kinetic analysis and the rational design of electrolysis systems for $P_4$ production. However, the practical application of this electrolysis has been previously limited by corrosion of the cathode material or other deactivation processes at the electrode surface leading to irreproducibility and periodic declines in performance. See, Plambeck, J. A. *Encyclopedia of Electrochemistry of the Elements, Volume X: Fused Salt Systems*; Marcel Dekker, 1976; pp 373-388, Laitinen, H. A.; Lucas, K. R. *J. Electroanal. Chem.* 1966, 12, 553-563, and Franks, E.; Inman, D. *J. Electroanal. Chem.* 1970, 26, 13-26, each of which is incorporated by reference in its entirety. Platinum is reported to be an anodically stable material that evolves oxygen. See, Delimarskii, Y. K.; Andreeva, V. N. *Zh. Neorg. Khim.* 1960, 5, 1800-1805, and Casey, E. J.; Dubois, A. R. *Can. J. Chem.* 1971, 49, 2733-2745, each of which is incorporated by reference in its entirety. As discussed here, the eludicidation of the cathodic reaction and blockage by gas and its application for high-current density electrolysis in a separated cell has moved this feature from a topic of academic inquiry to a commercially promising technology.

The electroreduction of molten polyphosphates was applied and investigated using a combination of product analysis, electrochemical kinetics and electrolyte design, as summarized by the following objectives: 1) design of a molten salt electrochemical cell; 2) isolation and characterization of the product material, 3) reproducible collection of electrokinetic data on the system; and 4) electrokinetic studies on the orthophosphate dependence of the reduction.

Referring to FIG. 2, the evolution of phosphorus and oxygen gases from the melt will increase the alkali ion content in the melt when used in a batch process. Ion balance can, however, be restored chemically by the addition of phosphoric acid and liberation of water, leading to a net input of phosphoric acid and output of white phosphorus, oxygen and water.

Figure 3A:
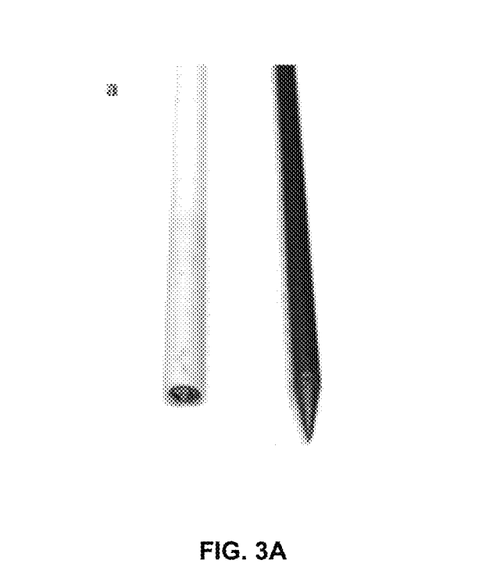
FIG. 3A depicts an electrode.
Figure 3B:
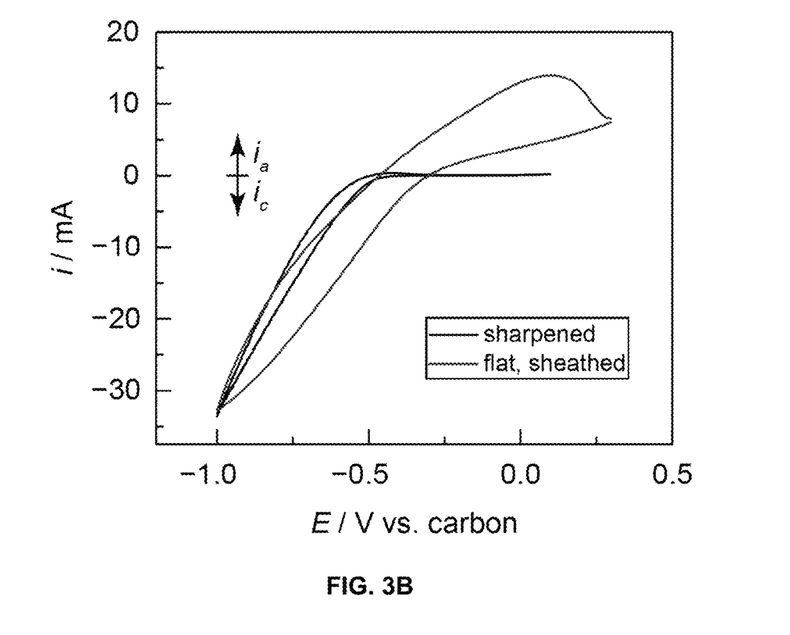
FIG. 3B depicts cyclic voltammograms.

As shown in FIG. 3A, the electrode can be a carbon electrode. As shown in FIG. 3A, the carbon electrode can be a flat, sheathed graphite rod electrodes (left) or sharpened graphite rod electrodes (right). Referring to FIG. 3B, cyclic voltammograms of each style of working electrode in the melt versus a graphite pseudoreference at 800° C. are shown. The flat sheathed electrode performance was inferior to the sharpened electrode.

Importantly, cathodic evolution of white phosphorus can be achieved using the system and methods described herein. The cathodic process in the electrolysis occurs via the reduction of phosphates to white phosphorus, as confirmed by condensation of the effluent nitrogen stream in a cold trap followed by $^{31}P$ NMR analysis. See FIG. 4. In a single-chamber cell electrolysis on graphite rod electrodes in a melt of sodium trimetaphosphate at 775° C., Faradaic collection efficiencies of white phosphorus in the apparatus were as high as 17% for a 5-electron reduction, with red phosphorus comprising an additional 2% of the collected product. The evolved gas rapidly blocked the surface of a flat, downward-facing and sheathed graphite cathode, as indicated by a 90% decline in current density until the electrode was jostled or removed. This gas blockage seems to be a likely cause for poor performance of carbon electrodes. Sharpening the graphite rod to a point, however, prevents gas blockage, allowing for consistently high steady-state currents of 100 mA cm$^{-2}$ or more at large enough overpotential to produce the white phosphorus.

Figure 5A:
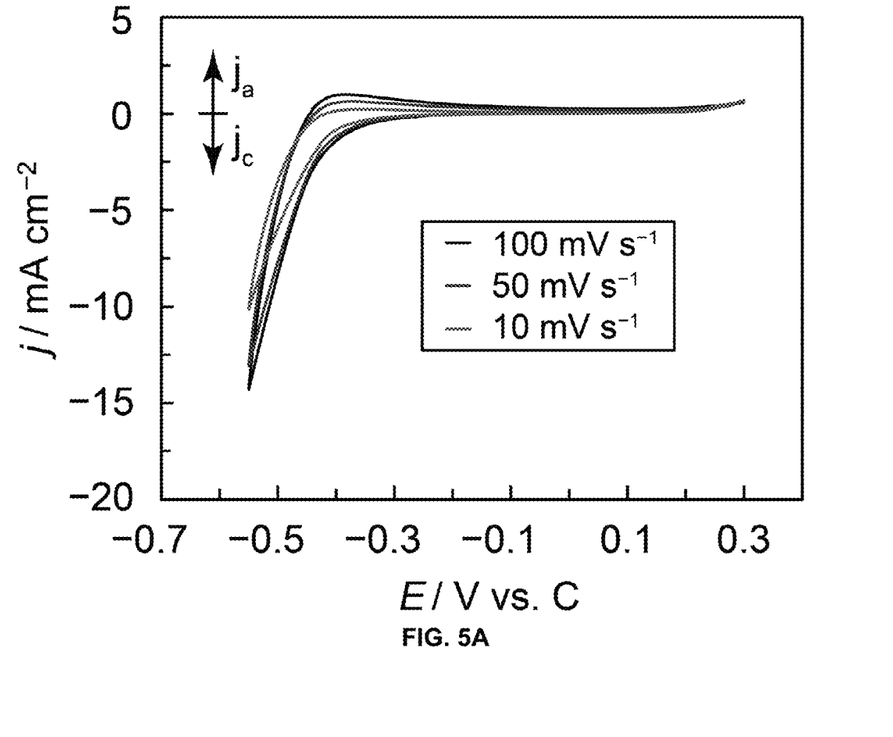
FIG. 5A depicts cyclic voltammograms of molten sodium metaphosphate.
Figure 5B:
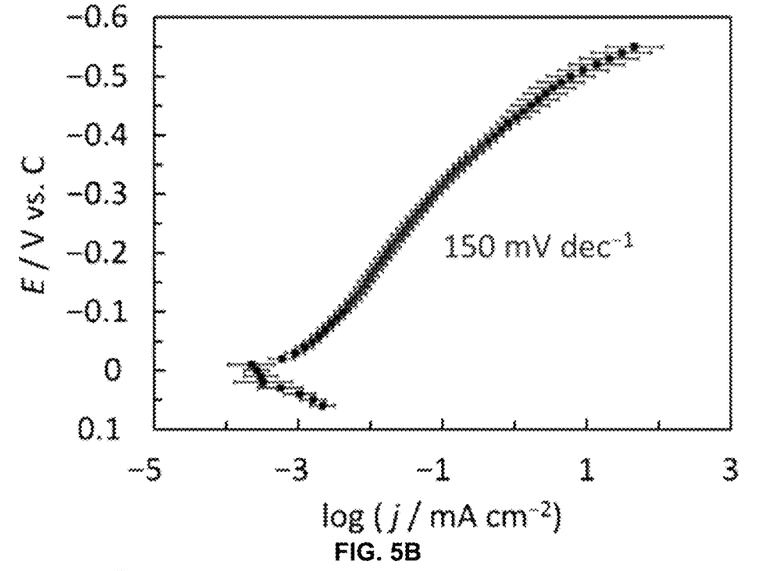
FIG. 5B depicts Tafel data of reduction reaction in trimetaphosphate on graphite.

Cyclic voltammograms of molten sodium metaphosphate on a sharpened graphite working electrode at 775° C. are shown in FIG. 5A. FIG. 5B shows Tafel data of reduction reaction in trimetaphosphate on graphite, averaged over 3 sets of 4 trials. Potentials are referenced to graphite pseudoreference. Steady-state plots in a glassy carbon crucible (FIG. 5B) show a slope of 150 mV dec$^{-1}$ at 775° C. (roughly two-thirds of 2.303RT/F at these temperatures, which equals 207 mV dec$^{-1}$), suggesting the reduction proceeds via a P(3+) intermediate by a 1-electron reduction pre-equilibrium followed by a rate-limiting transfer of a second electron.

Figure 6A:
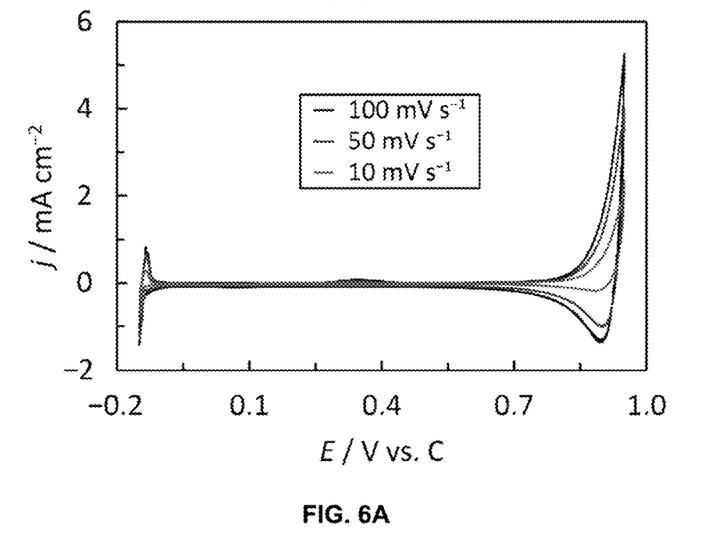
FIG. 6A depicts cyclic voltammetry on a platinum wire in the melt.
Figure 6B:
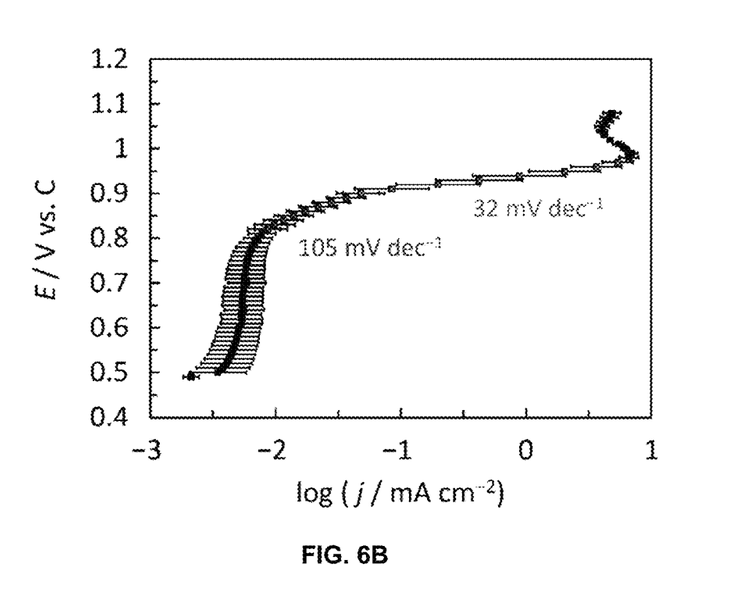
FIG. 6B depicts Tafel data of oxidation reaction in trimetaphosphate on platinum.

Anodic reactions and product separation has also been studied. Cyclic voltammograms of molten sodium metaphosphate on a platinum wire working electrode are shown in FIG. 6A. The cyclic voltammetry on a platinum wire in the melt (FIG. 6A) shows a peak corresponding to oxide formation on the surface followed by the onset of oxidative oxygen evolution at −0.8 V versus a separate graphite rod, which was able to function as a pseudoreference due to its low polarizability in the melt. Tafel data of oxidation reaction in trimetaphosphate on platinum, averaged over 4 trials with potentials referenced to graphite pseudoreference are shown in FIG. 6B. The Tafel data collected on this system suggests a 2-electron preequilibrium oxidation at low overpotentials. In this system, a graphite rod was found to function as a sacrificial anode at voltages above 0.0 V corresponding to oxidation to carbon dioxide and carbon monoxide.

Figure 7:
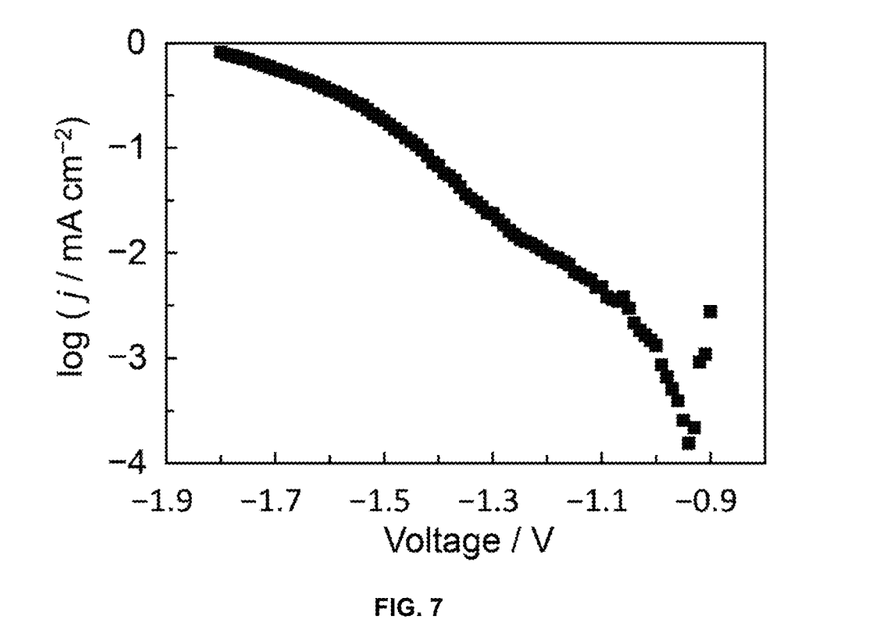
FIG. 7 depicts a steady-state polarization curve.

Based on this performance relative to the pseudoreference, a solution resistance-compensated overall cell with electrodes of equal size could operate at 100 mA cm$^{-2}$ with a voltage of −1.6 V on a platinum anode or as low as −0.6 V for a sacrificial carbon anode. A steady-state polarization curve of a 2-electrode system composed a limiting graphite cathode and a platinum coil anode in sodium trimetaphosphate was generated, as shown in FIG. 7 (voltages are uncompensated). In this initial study of a simple 2-electrode setup using a graphite cathode and platinum anode (FIG. 7), an uncompensated potential of −1.7 V was able to run at a capacity of nearly 1 mA/cm$^2$ even under a sampled solution resistance of 24Ω. Current density is predicted to improve significantly with optimization of the electrode and melt compositions.

Figure 8A:
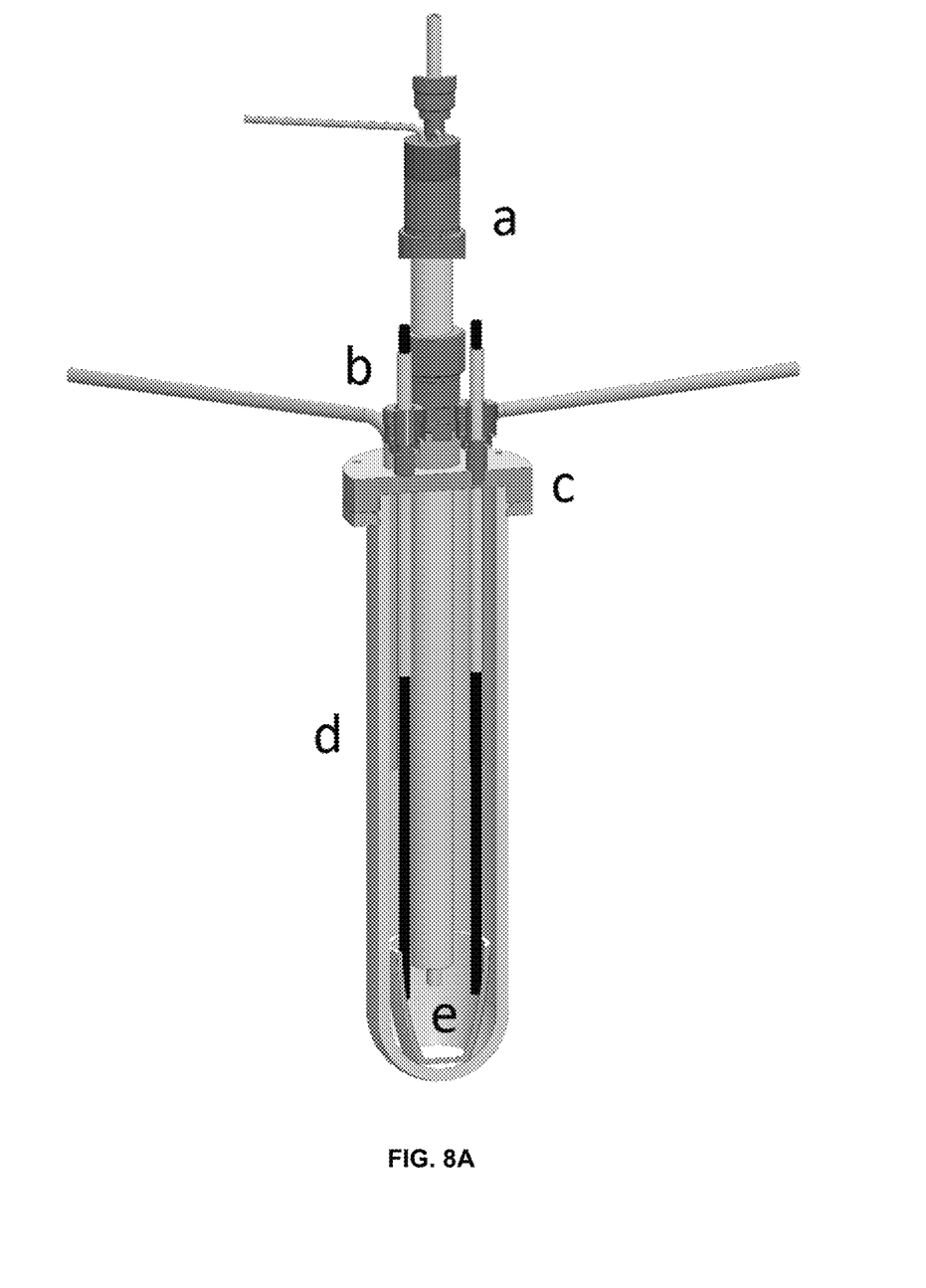
FIGS. 8A, 8B and 8C depict a sealed reaction vessel.
Figure 8B:
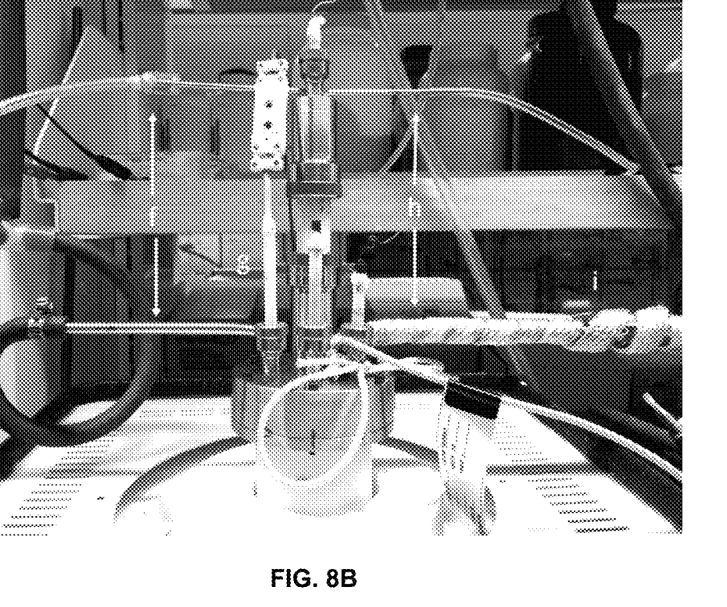
Figure 8C:
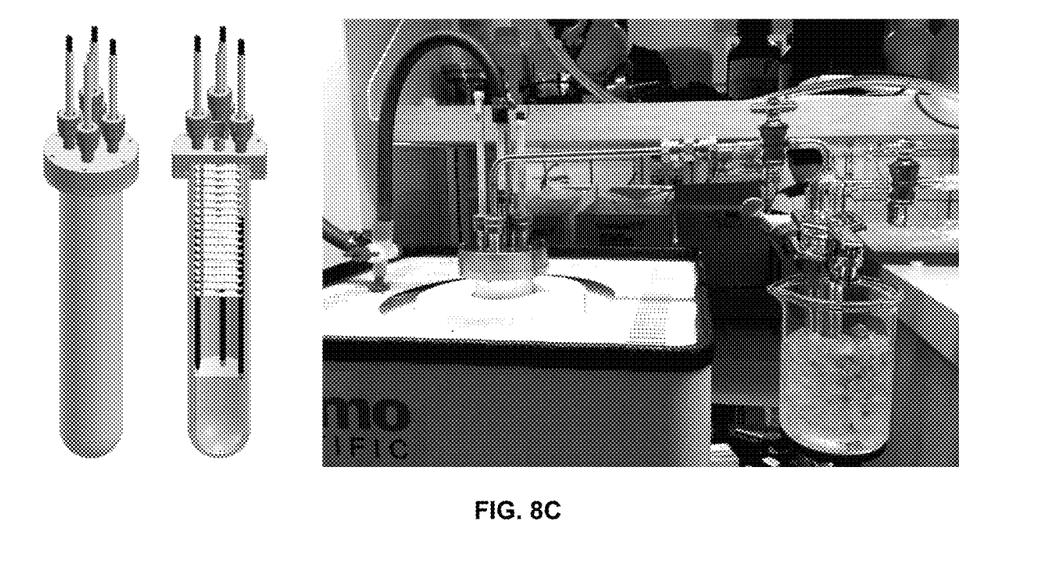

Based on this information, device assembly can be addressed. In one example, the reactor consists of a sealed reaction vessel (FIG. 8C) consisting of an alumina tube containing a crucible and fitted at the top with a number of ports. In another example, the reactor is redesigned to accommodate an inserted crucible and a counter reaction tube (FIGS. 8A and 8B). Referring to FIGS. 8A and 8B which are diagram of a molten phosphate electrolysis cell, the following features can be important to the cell design: a) Hollow alumina tube containing a counter electrode inserted from top; b) Ultra-Torr fittings to hold graphite electrodes; c) a steel cap with Kalrez O-ring seal; d) alumina tube heating zone; e) crucible containing metaphosphate; f) nitrogen inflow tubes (working and counter chambers); g) thermocouple to monitor melt temperature; h) nitrogen outflow tubes; and i) heating tape connection to a glass cold trap to collect the product. Although the airtight seals were made via Ultra-Torr fittings and Kalrez O-rings for mobility of electrodes and high-temperature seal stability, less expensive sealing methods could be employed in industry. Nitrogen gas flows into the cell through a series of steel entry and exit tubes, with the gas from the main chamber flowing into a glass cold trap with airtight valves lubricated with high-temperature grease. The exit tube was heated with heating tape above the boiling point of white phosphorus (280° C.) in order to maximize product collection in a cold trap (FIG. 8C). Although alumina crucibles were found to corrode over time in the melt, a glassy carbon crucible was found to be highly stable over the course of overnight experiments (mass loss 0.04%, likely due to scraping on tube walls during insertion and removal).

By surrounding the counter electrode with a thermally resistant tube and submerging the assembly in the molten metaphosphate salt, cathodic and anodic gases can be evolved with virtually no crossover by taking advantage of the negligible solubility of gases in the melt. An alumina tube was employed in these studies for ease of use, since the corrosion process was found to be relatively slow, but the tube could be replaced with a material less prone to corrosion (i.e. carbon or a tube having a gold or platinum coating) as long as the counter electrode is carefully aligned in the chamber to prevent electrical contact.

As noted above, white phosphorus is a critical chemical feedstock which is used to produce virtually all commercial phosphorus compounds, including food additives, pesticides, flame retardants and plasticizers, among others. Using this reactor, chemical companies would be able to produce white phosphorus on-site using phosphoric acid and renewable electrical energy as inputs, such as solar, wind or other electrical energy source, which can reduce or eliminate pollution and the risk of hazardous spills during transportation. With the system and methods described here, white phosphorus can also be generated without the production of any carbonaceous gases, which has the potential to eliminate roughly 3.25 M tons of global carbon dioxide emissions by phosphorus manufacturing companies per year.

The work described herein has elucidated a number of important factors regarding the reduction process in molten metaphosphates: 1) elemental $P_4$ is an isolable and significant product at −0.6 V; 2) the reduction process occurs via a 2-electron transfer where the second step is rate-limiting; and 3) the reduction process can be suppressed by the addition of $Na_3PO_4$.

Single-cell experiments were conducted as follows. A molten salt cell consisting of a 2-inch OD alumina tube, a machined steel cap and modular Ultra-Torr ports was designed to accommodate a variety of high-temperature electrochemical experiments. The design (FIG. 8C) enabled continuous collection of evolved gaseous products. While Viton O-rings were used in some purely electrokinetic experiments to make seals to the main chamber and to the electrode tubes, Kalrez O-rings were employed for bulk electrolysis experiments due to their better resilience at the boiling point of the target $P_4$ at 280° C. In order to better insulate the top seals, a series of steel baffles were placed below the cap's rim. With this setup, the melt could be held at 650-800° C. (with a variability of ±2° C.) in a Thermo Scientific crucible furnace while the top of the cell was maintained at 250-300° C. To ensure corrosion resistance under the reaction conditions, the cell was designed to accommodate 3/16-inch OD graphite rod electrodes (Electron Microscopy Sciences, ≥99.9998%) sheathed with ¼-inch OD alumina tubes. An alumina-sheathed thermocouple was used to monitor the melt temperature during all electrokinetic studies, but during electrolysis studies, this was replaced with a steel gas collection tube wrapped in heating tape. Nitrogen gas was flowed into the top of the cell and exited into a tube several inches above the melt surface, which passed through heating tape and vented into a glass cold trap through a stopcock. This gaseous product stream was chilled by an ice bath and exited through a second stopcock into a bleach bubbler. This setup allowed for the collection of gaseous products at much higher temperatures than previous studies.

Before each experiment, 220 g of trisodium trimetaphosphate powder (Sigma Aldrich, ≥95%) were premelted in a tube at 800° C., then cooled and assembled with the appropriate electrodes and accessories, which could then be inserted into the melt upon reheating. A liquid sodium reference electrode sheathed in $Na^+$-conducting beta alumina was initially pursued, but because the sheath ceramic quickly corroded in the melt, a graphite pseudoreference was employed in the studies reported here. The cyclic voltammetry and Tafel behavior was comparable under both reference systems, with the graphite pseudoreference displaying a reproducible potential of +2.4 V vs. the Na+/Na couple. The sodium reference study was convoluted by dissolution of alumina from the container, but the Tafel slopes and voltage ranges were found to agree especially well between reference electrodes in identically prepared systems (108 mV/dec using a $Na^+$/Na reference, 110 mV/dec using a graphite reference, both extending over a 150 mV range following a 50 mV onset of current). The stability of the graphite pseudoreference potential is believed to result from its very narrow window of polarizability. At mildly negative potentials, the onset of phosphate reduction is observed, and at mildly positive potentials, the graphite oxidizes to products like carbon dioxide and carbon monoxide.

Although platinum, a reported oxygen evolution catalyst in the melt, has been reported to be stable as an anode material, a graphite rod, deeply submerged to maximize surface area, was chosen as the counter because the oxidation products (primarily $CO_2$ and CO) would be less reactive towards the evolved cathodic product. Finally, since flat, sheathed graphite working electrodes were found to trap gas bubbles that led to severe mass transport limitations and inconsistency, the working electrodes in the reported data were sharpened to a point, which enabled reproducible activation-controlled CV and Tafel behavior. The formation of gas bubbles on sheathed electrodes may explain the irreproducibility and periodic fluctuations often reported in electrochemical studies of the cathodic reaction.

Figure 4:
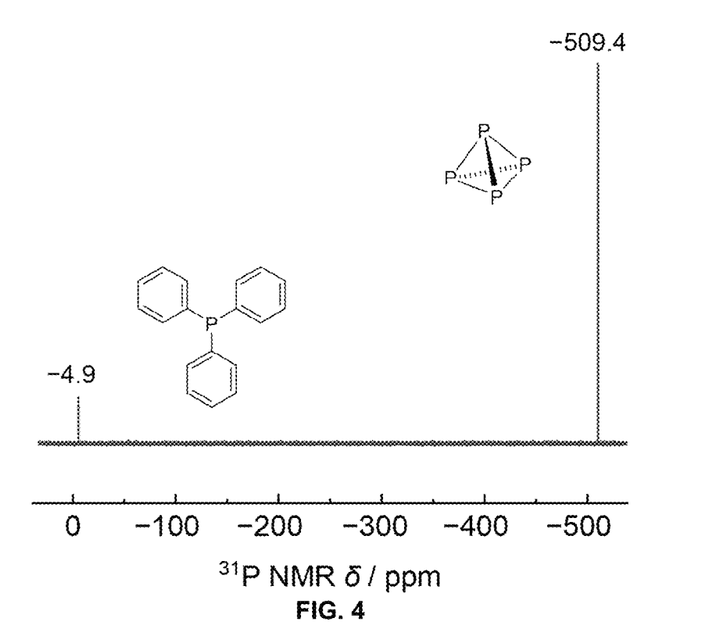
FIG. 4 depicts a $^{31}P$ NMR spectrum.

Although no product was collected in the cold trap in the absence of an applied voltage, when the potential of the working electrode was held at −0.6 V vs. the carbon pseudoreference and product was collected via the setup described above, a white, waxy film was observed to form on the inside of the glass cold trap which slowly condensed into small granules of solid and developed a slight orange tinge over time (attributed to the formation of red phosphorus). The product was readily soluble in carbon disulfide and displayed a single peak under $^{31}P$ NMR at −509.4 ppm vs. 85% $H_3PO_4$, a characteristic shift consistent with white phosphorus (FIG. 4). When the integration was compared to a triphenylphosphine standard at −4.9 ppm, the amount of $P_4$ was found to represent as much as 17.1% of the Faradaic efficiency of the 598 Coulombs passed, an impressive amount considering that gases evolved from the anode ($CO_2$, $O_2$) should react with $P_4$ and impede product collection. $P_4$ constituted 90.7% of the total trap product (the remainder was red phosphorus), and no phosphorus-containing species could be observed in a bleach bubbler solution by NMR even after boiling off to solution saturation.

On sharpened graphite working electrodes, cyclic voltammetric and Tafel data were very reproducible. Although the window of polarizability was small (<100 mV), it was possible to estimate the surface area of the working electrode by the double layer capacitive current in this narrow region. The geometric conversion factor used in all reported data was 0.00928 $cm^2/\mu F$ based on geometric calculation of the cone area after measuring the visible level of submersion. Although the reductive current onsets immediately, the window of <1 $mA/cm^2$ current density spans from roughly −0.4 V to 0.3 V vs the carbon pseudoreference by cyclic voltammetry (FIG. 5A). The scan rate dependency of the current density is much lower than the square root of the scan rate, suggesting that the rate-limiting step is dependent on kinetics or mass transport-dependent rather than diffusion. Additionally, steady-state data collected on the cathodic process demonstrates consistent, reproducible pseudo-Tafel behavior (FIG. 5B).

Separated-cell experiments were performed analogously to the previous method, with the exception that a smaller amount of metaphosphate was used (roughly 60 g per experiment) and nitrogen was flowed through tubes in the anode chamber as well as the main cathodic chamber; this cathodic gas was bubbled through a separate trap. This design also allowed the containment material to be changed from alumina to glassy carbon. When the presence of corrosion-based impurities was minimized by use of a glassy carbon crucible and graphite electrodes, the observed Tafel slope in the pure $Na_3(PO_3)_3$ melt was 150 mV/decade. Based on the fact that 2.303RT/F at these temperatures is 207 mV/decade, one can extrapolate a tentative mechanism using Equation 1

$$\text{slope}\left(\frac{mV}{\text{decade}}\right) = 2.303 \frac{RT}{\left(\frac{\gamma}{\nu} + r\beta\right)F} \quad (1)$$

where ν is the stoichiometric number of the reaction, γ is the number of electrons transferred before the rate-limiting step, and r is the number of electrons transferred during the rate-limiting step. The experimental slope of 150 mV/decade indicates that the quantity (γ/ν+rβ) equals 1.5. Since β represents the symmetry factor of the electrochemical reaction and is typically close to 0.5, one can extrapolate that γ/ν=1, suggesting a 1-electron preequilibrium reduction, and r=1, suggesting a rate-limiting 1-electron transfer. Based on this information, a tentative mechanism is proposed where P(5+) polyphosphate centers in the melt are reduced by 1 electron to a P(4+) center, then subsequently reduced in a rate-limiting electron transfer to a P(3+) species.

Since the reduction of the phosphate center in such a process would necessitate the ejection of a bound polyphosphate or oxide group, the reduction reaction should be suppressed by the introduction of chemical species that break polyphosphate bonds. In order to test this hypothesis, $Na_3PO_4$ was added to the melt to decrease the equilibrium population of phosphate anhydride (P—O—P) bonds and, therefore, suppress the onset of current. Because P—O—P linkages can break and reform in the melt, the average chain length reaches an equilibrium value which can be lowered by the addition of $Na_3PO_4$, which breaks anhydride bonds. If the reduction process is, in fact, accompanied by anhydride bond breakage or oxide ejection, addition of $Na_3PO_4$ should suppress the reaction, either by disfavoring the 1-electron preequilibrium reaction through thermodynamics or possibly by interfering with the kinetics of the rate-limiting step.

Figure 9A:
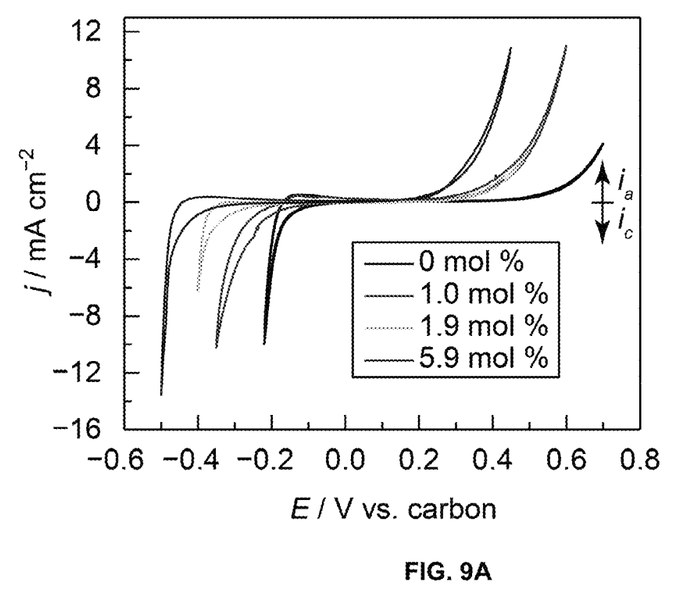
FIG. 9A depicts cyclic voltammograms.
Figure 9B:
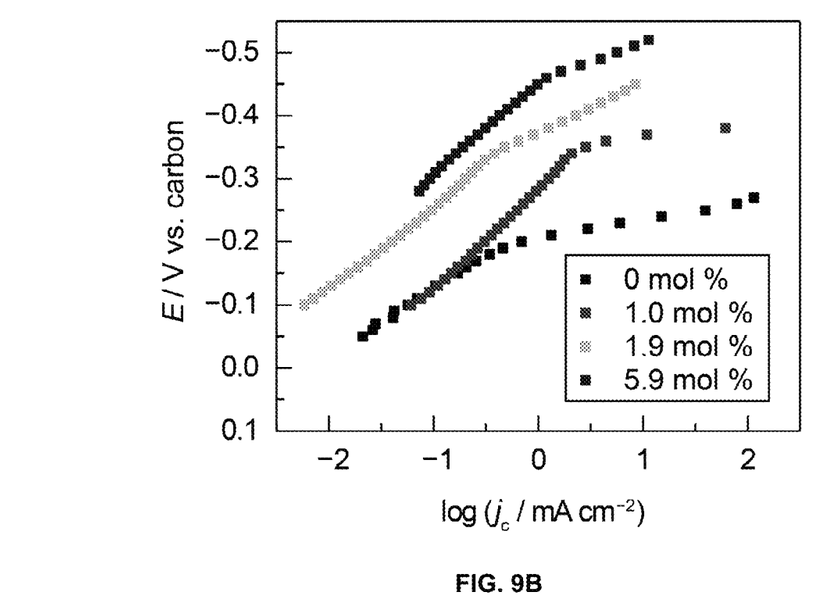
FIG. 9B depicts Tafel data.

Preliminary experiments described here were performed by adding tribasic orthophosphate $Na_3PO_4$ (Sigma Aldrich, ≥98%) directly or, in the 5.9 mol % case, by adding $Na_2CO_3$ (Macron, ≥97%), which outgassed $CO_2$ to release $Na_2O$, which consumes $(NaPO_3)_n$ to form $NaPO_3$. The melt compositions tested were 0%, 1.0%, 1.9% and 5.9 mol % $Na_3PO_4$. Under cyclic voltammetry (FIG. 9A), the cathodic onset was observed to shift outward by 300 mV over this series. This behavior was mirrored by an inward shift in both linear portions of the steady-state Tafel plots (FIG. 9B). These two results both indicate suppressed phosphate reduction activity. Although these preliminary results were collected early in the single-chamber setup and are convoluted to a certain extent by the concurrent corrosion of the alumina container, this trend nevertheless provides some tentative evidence against one theory that orthophosphate, not polyphosphate, is the active species being reduced, since in such a situation the reduction should have been promoted by shifting equilibrium towards shorter chains and, therefore, towards $Na_3PO_4$. (See Franks, E.; Inman, D. *J. Appl. Electrochem.* 1971, 14, 73-78, which is incorporated by reference in its entirety) The influence of dissolved $Na_3PO_4$ and $Al_2O_3$ on reduction activity in the purer glassy carbon crucibles is being studies and can derive rate order dependencies accordingly in the near future.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. A method of generating elemental phosphorus comprising:
   providing a melt of a metaphosphate salt;
   applying an electrolysis voltage across a cathode and an anode in the melt,
   collecting an elemental phosphorus separate from an oxidized product; and
   adding phosphoric acid to the melt to replenish phosphorus.

2. The method of claim 1, wherein the elemental phosphorus includes $P_4$.

3. The method of claim 1, wherein the oxidized product includes oxygen gas.

4. The method of claim 1, wherein the oxidized product includes carbon monoxide or carbon dioxide.

5. The method of claim 1, further comprising carrying the elemental phosphorus away from the melt using a gas.

6. The method of claim 1, wherein the metaphosphate salt includes sodium metaphosphate, lithium metaphosphate, potassium metaphosphate, or a mixture thereof.

7. The method of claim 1, further comprising maintaining the melt at a temperature less than 1500° C., less than 1300° C., less than 1100° C., less than 1000° C., less than 900° C., between 500° C. and 900° C., between 600° C. and 875° C., between 650° C. and 850° C., or between 750° C. and 850° C.

8. The method of claim 1, wherein the electrolysis voltage is between 0.1 and 5.0 V, between about 0.4V and 2.0V, between about 0.5V and 1.8V, or between about 0.6V and 1.7V.

9. The method of claim 1, wherein the electrolysis voltage is 0.1, 0.2, 0.3, 0.4, 0.5 V, 0.6V, 0.7V, 0.8V, 0.9V, 1.0V, 1.1V, 1.2V, 1.3V, 1.4V, 1.6V, 1.7V, 1.8V or 1.9V, 2.0 V, 2.1 V, 2.2 V, 2.3 V, 2.4 V, 2.5 V, 2.6 V, 2.7 V, 2.8 V, 2.9 V, 3.0 V, 3.1 V, 3.2 V, 3.3 V, 3.4 V, 3.5 V, 3.6 V, 3.7 V, 3.8 V, 3.9 V, 4.0 V, 4.1 V, 4.2 V, 4.3 V, 4.4 V, 4.5 V, 4.6 V, 4.7 V, 4.8 V, 4.9 V, or 5.0 V.

10. The method of claim 1, wherein the melt is free of transition metals.

11. The method of claim 1, wherein the melt is free of halides.

12. The method of claim 1, wherein the melt is contained in a crucible.

13. The method of claim 1, wherein the anode is an electrode material that facilitates oxygen production.

14. The method of claim 1, wherein the anode includes platinum or carbon.

15. The method of claim 1, wherein the cathode includes carbon.

16. The method of claim 1, wherein the cathode is carbon having a sharp end.

17. The method of claim 1, further comprising adding an additive to the melt.

18. The method of claim 17, wherein the additive includes a metal salt, a phosphate mineral, a promoter or other compound.

* * * * *